United States Patent [19]
DiStefano et al.

[11] Patent Number: 5,977,236
[45] Date of Patent: Nov. 2, 1999

[54] POLYMERS PREPARED IN THE PRESENCE OF COLLOIDAL POLYURETHANE DISPERSIONS

[75] Inventors: Frank Vito DiStefano, Macungie; Bruce Alan Gruber, Emmaus, both of Pa.

[73] Assignee: Air Products and Chemicals, Inc., Allentown, Pa.

[21] Appl. No.: 08/844,493

[22] Filed: Apr. 18, 1997

[51] Int. Cl.$^6$ .................................................. C08J 3/02
[52] U.S. Cl. .......................... 524/457; 524/503; 524/507
[58] Field of Search .................. 524/457, 503, 524/507, 459

[56] References Cited

U.S. PATENT DOCUMENTS

| | | | |
|---|---|---|---|
| 3,684,759 | 8/1972 | Reiff et al. | 524/457 |
| 4,190,566 | 2/1980 | Noll et al. | 260/29.2 TN |
| 4,927,876 | 5/1990 | Coogan et al. | 524/457 |
| 4,992,507 | 2/1991 | Coogan et al. | 524/591 |
| 5,126,411 | 6/1992 | Rauterkus et al. | 524/457 |
| 5,128,406 | 7/1992 | Padget et al. | 524/714 |
| 5,173,526 | 12/1992 | Vijayendran et al. | 524/457 |
| 5,314,942 | 5/1994 | Coogan et al. | 524/457 |
| 5,326,808 | 7/1994 | Floyd et al. | 524/457 |
| 5,443,674 | 8/1995 | Fresonke et al. | 156/331.7 |

FOREIGN PATENT DOCUMENTS

| | | |
|---|---|---|
| 13726 | of 1994 | Germany . |
| 19508856 | 9/1996 | Germany . |

*Primary Examiner*—Judy M. Reddick
*Attorney, Agent, or Firm*—Russell L. Brewer

[57] ABSTRACT

Disclosed are improved vinyl acetate/ethylene copolymers emulsion polymerized in the presence of colloidal, nonionic, water dispersible polyurethanes. The improvement resides in vinyl acetate and ethylene polymerized in the presence of a costabilizer comprising the colloidal, nonionic, water dispersible polyurethanes and polyvinyl alcohol.

10 Claims, No Drawings

POLYMERS PREPARED IN THE PRESENCE OF COLLOIDAL POLYURETHANE DISPERSIONS

BACKGROUND OF THE INVENTION

Water borne polymers prepared by emulsion polymerization are extremely important commercial materials. Because of the dual phase nature of these materials they require a stabilizing package to maintain water dispersibility. Often stability is maintained through the addition of surfactants or water soluble polymers such as polyvinyl alcohol and cellulose. In addition to maintaining water dispersibility, these stabilizers offer other end use advantages in specific applications.

Emulsion polymers have been prepared in the presence of water dispersible polyurethanes. Typically, these polymers are referred to as hybrids combining features of each while differing from the features of blends. For the most part, such water dispersible polyurethanes have been anionic polyurethanes incorporating amine neutralized carboxyl functionality. More recently, some nonionic polyurethanes have been utilized to stabilize the emulsion polymerization of a variety of monomers. Polyurethane dispersions also have been post added to emulsions to improve film coalescence and add toughness, but this approach is often hindered by lack of emulsion stability when the two components are mixed together and also by incompatibility of the urethane and vinyl polymer resulting in cloudy films and poor mechanical properties.

Representative patent literature which show anionic water dispersible polyurethanes and hybrid systems are as follows:

U.S. Pat. No. 5,173,526 discloses a process for producing an aqueous polyurethane-vinyl polymer (hybrid) coating composition by (a) forming a carboxy-containing, water-dispersible, isocyanate-terminated polyurethane prepolymer, (b) adding a vinyl monomer mixture to the carboxy-containing, water-dispersible, isocyanate-terminated polyurethane prepolymer to make a prepolymer/monomer mixture, (c) adding tertiary amine to the prepolymer/monomer mixture, (d) dispersing the prepolymer/monomer mixture in water, (e) adding an oil-soluble free radical initiator and a chain extender to the aqueous dispersion and (f) completing the chain extension and polymerizing the vinyl monomers by heating the aqueous dispersion. A variety of vinyl monomers, which include lower alkyl ($C_{1-6}$) esters of acrylic or methacrylic acid, are suggested as being suited for the hybrid.

U.S. Pat. No. 4,927,876 discloses two types of aqueous polymer dispersions for use as coating compositions, the dispersions comprising a water dispersible polyurethane containing diphenylmethane diisocyanate and a vinyl polymer. The water dispersible polyurethane component is prepared by forming an isocyanate terminated prepolymer having carboxyl functionality incorporated therein and chain extending with an amine. In forming the aqueous dispersion, the vinyl polymer may be blended with the water dispersible polyurethane or the vinyl monomer may be polymerized in the presence of the aqueous polyurethane dispersion. A variety of monomers suited for polymerization are suggested which include acrylates and hydroxyacrylates.

Nonionic, water dispersible polyurethanes have been utilized in the formulation of coatings for wood, metals and flexible substrates. Representative examples are set forth in the following patents:

U.S. Pat. No. 4,190,566 discloses nonionic, water dispersible polyurethanes having a linear molecular structure. The nonionic, water dispersible polyurethanes are formed by reacting organic diisocyanates with difunctional organic compounds having molecular weights from about 300 to 6,000 in the presence of components having hydrophilic groups, e.g., conventional polyether and polyester polyols, guaranteeing the dispersibility of the polyurethanes. The hydrophilic components are based on reacting alkylene oxides with monofunctional alcohols or any alternative reacting monoisocyanate with the polyether alcohol. Optionally, the water dispersible polyurethanes may be blended with other vinyl polymers for the formulation of coatings.

U.S. Pat. No. 4,992,507 discloses aqueous dispersions of nonionic, water dispersible polyurethanes having pendent polyoxyethylene chains and free acid or free tertiary amino groups. These water dispersible polyurethanes are formed by reacting inorganic polyisocyanate with an organic polyol and a dispersing diol or diisocyanate having pendant polyoxyethylene chains and an isocyanate reactive compound containing at least a carboxylic acid group. Examples of isocyanate reactive compounds having carboxy groups include 2,2-dimethylolpropionic acid. In this polymer, the acid remains as the free carboxy group rather than the salt. Typically, the carboxy functionality is reacted with amine to form the anionic water dispersible polyurethanes.

WO 94/13726 discloses a class of hydrophilic polyurethanes which are water dispersible. These polyurethanes are high viscosity, water dispersible polyurethanes, and these are formed by reacting aliphatic or aromatic diisocyanates with polyethylene glycol which are polyaddition products of ethylene oxide and a variety of divalent alcohols, a representative is the reaction product of a polyethylene glycol with meta-tetramethylxylene diisocyanate. The patent also discloses the use of these high viscosity polyurethanes as protective colloids in combination with conventional nonionic surfactants for use in stabilizing the emulsion polymerization of monomers such as vinyl acetate and vinyl chloride. The patentees point out that the resulting polyvinyl acetate results in the production of water-resistant films.

DE 195 08 856 discloses the use of water soluble-nonionic polyurethanes as protective colloids of the type described in WO 94/13726 for the emulsion polymerization of a variety of monomers. Representative monomers suited for forming aqueous dispersions include acrylic and methacrylic acid esters, acrylic and methacrylic acids as well as their hydroxy alkyl esters, vinyl acetate and copolymers of vinyl acetate and ethylene. The patentees also point out that redispersible powders can be obtained from these emulsions. Representative examples then show the use of the water soluble polyurethanes as protective colloids alone and in combination with surfactants for the polymerization of ethylene, vinyl acetate and N-methylol acrylamide.

U.S. Pat. No. 5,314,942 discloses the preparation of aqueous polymer dispersion containing vinyl polymer and a nonionic water-dispersible polyurethane having pendent polyoxyethylene chains. The nonionic polyurethanes having pendent polyoxyethylene chains are alleged to possess significant advantages over the anionic polyurethanes described in the art. Acrylic, substituted acrylic and vinyl esters are alleged for use in emulsion polymerization. The ratio of polyurethane to vinyl polymer is within a weight range of 1:9 to 9:1. Most of the examples show the polymerization of acrylic monomers in the presence of the nonionic dispersion and sodium lauryl sulfate.

SUMMARY OF THE INVENTION

This invention relates to improved vinyl acetate/ethylene adhesive copolymers emulsion polymerized in the presence of a colloidal, nonionic, water dispersible polyurethane stabilizer. The improvement resides in vinyl acetate and ethylene copolymers polymerized in the presence of a costabilizer of the nonionic, water dispersible polyurethane and polyvinyl alcohol. These improved vinyl acetate/ethylene adhesive emulsions provide for the following:

- an ability to provide for water-resistant vinyl acetate/ethylene adhesives;
- an ability to form freeze-thaw stable vinyl acetate/ethylene emulsions;
- an ability to form vinyl acetate/ethylene adhesives having excellent creep resistance;
- an ability to form adhesive emulsions having excellent speed of set times;
- an ability to generate adhesive films having improved toughness and abrasion resistance and enhanced adhesion; and,
- an ability to form vinyl acetate/ethylene emulsions in the presence of a nonionic polymer without detracting from the generally overall properties to the vinyl acetate/ethylene polymer.

DETAILED DESCRIPTION OF THE INVENTION

Vinyl acetate and ethylene adhesives are widely used in the lamination of polymeric and textile substrates. These vinyl acetate/ethylene ethylene adhesives contain typically from 5 to 40% by weight of ethylene and have a glass transition temperature of from about −10 to 25° C. Preferred vinyl acetate/ethylene adhesives employed in the practice of this invention will have from 15 to 25% by weight ethylene. Optionally, other ethylenically unsaturated monomers may be copolymerized with the vinyl acetate and ethylene. Generally the vinyl acetate/ethylene adhesives should contain not more than 0 to 10% by weight and preferably less than 5% by weight of optional monomers. Suitable ethylenically unsaturated monomers include esters of acrylic and methacrylic acids, higher esters of vinyl alcohol and substituted styrenes. Specific examples of optional ethylenically unsaturated monomers include styrene, substituted styrenes, the lower alkyl ($C_1$–$C_6$) esters of acrylic, methacrylic and maleic acids, vinyl propionate, and butyrate, acrylonitrile and vinyl ethers. The resulting copolymer will have a number average molecular weight from 150,000–850,000.

The stabilizer system used for the emulsion polymerization of vinyl acetate/ethylene is key to the improved vinyl acetate/ethylene adhesives and the stabilizer system is comprised of (1) the nonionic water-dispersible polyurethane emulsion formed by the reaction of an organic diisocyanate and water soluble polyethylene glycols or the water soluble polyglycol adduct of an alcohol and (2) polyvinyl alcohol. Preferably the polyvinyl alcohol has a degree of hydrolysis of from 87 to 98.8% and a 4% solution viscosity in water at 20° C. of from 3 to 55 centipoises. The number average molecular weight (Mn) will range from 100 to 100,000.

The nonionic, water dispersible polyurethanes employed as protective colloids are of the type described WO 94/13726 and comprise the reaction product of an aliphatic or aromatic diisocyanate and a hydrophilic component and they are incorporated by reference. More specifically, the polyisocyanates used in making the nonionic, water dispersible polyurethane prepolymer include aliphatic, cycloaliphatic, araliphatic or aromatic polyisocyanates. Examples of suitable polyisocyanates include tetramethylxylylene diisocyanate, isophorone diisocyanate, cyclohexane-1,4-diisocyanate, 4,4'-dicyclohexylmethane diisocyanate, 3,3-dimethyl-4,4 -di(aminocyclohexyl) methane diisocyanate, hexamethylene diisocyanate, dodecamethylene diisocyanate, 1,4-phenylene diisocyanate, 2,4-toluene diisocyanate, 2,6-toluene diisocyanate, 4,4'-diphenylmethane diisocyanate, 2,4-diphenylmethane diisocyanate, m-xylylene diisocyanate, 1,4-diisocyanatobenzene, polymethylene polyphenyl polyisocyanates and 1,5-naphthalene diisocyanate.

The hydrophilic component which is reacted with the polyisocyanate to form the nonionic polyurethane is based upon polyethyleneoxides and adducts of polyethyleneoxides with water and/or alcohols. To be water-soluble, generally at least 70 weight percent of the polyol component is comprised of ethylene glycol units. Some portion of the alkanol may be hydrophobic and thus the nonionic polyurethane may be the reaction product of ethylene oxide and $C_{2-4}$ divalent alcohols. These include ethylene glycol, butane diol, propylene glycol, and so forth. Polyvalent alcohols may be included for purposes of viscosity adjustment. Ethylene glycols having number average molecular weights in the range of 500–100,000, preferably 1000 to 20,000 and especially 3000 to 12,000 are typically used as the polyols. In preferred stabilizers, branched polyols such as trimethylol propane, glycerin, pentaerythritol, and the like are employed to increase molecular weight. The level of higher polyols, e.g., hydroxy functionality greater than 3 is normally within a range of from 0.5 to 1.5% by weight.

In the formulation of the stabilizer system, the stabilizers are used in an amount of from about 3 to 10% based on the weight of the vinyl acetate in the copolymer or, stated in the alternative, from 2 to 6% by weight of the emulsion including water. The percentages of the polyurethane in the stabilizer will range from about 15 to 75%, preferably 40 to 60% by weight. Conversely, the percentages of polyvinyl alcohol in the stabilizer will range from about 85 to 25%, preferably 60 to 40% by weight. The combination of polyvinyl alcohol with the polyurethane provides for enhanced adhesion properties and creep resistance.

Polymerization of the ethylenically unsaturated monomers in the presence of the stabilizer combination of nonionic polyurethane dispersion and polyvinyl alcohol is effected via free radical polymerization. Redox initiators could be used such as hydrogen peroxide with sodium formaldehyde sulfoxylate. Redox systems comprising reducing agents and oxidizing agents (free radical initiators) are well known in the polymerization art. Hydrogen peroxide can be replaced by organic hydroperoxides, for example tertiary butyl hydroperoxide, t-BHP. Other redox systems are known in polymerization art as well as thermal initiators, such as peroxydisulfates.

The free radical polymerization of the monomer mixture is conducted at an elevated temperature, namely a temperature sufficient to liberate free radicals at a rate that sustains the polymerization reaction. A suitable temperature range would be 50° C. to 90° C., preferably 60° C. to 80° C.

Other ingredients commonly used in adhesive formulations, can be added to the formulation to tailor properties as desired. These compositional modifications are well known in the art of adhesive formulation.

The following examples are provided to illustrate various embodiments of the invention and are not intended to restrict the scope thereof.

COMPARATIVE EXAMPLE 1

Preparation Of Vinyl Acetate-Ethylene Copolymers Stabilized With Nonionic Polyurethane As Sole Stabilizer Nonionic polyurethane dispersions are prepared as described in patent WO/9413726 A1 (1994) and supplied by Henkel as Disponil PC 14 and 17:

General Procedure

Into a dry vessel equipped with agitator, nitrogen inlet, jacket equipped with heating and cooling, delay feed lines and capable of pressurization to 1000 psi is charged D.I. water and the aqueous urethane dispersion. The pH is adjusted to 3.6 with phosphoric acid. A 1% iron solution is added and, with agitation on, an initial charge of vinyl acetate (44.2% of total) is added. The reactor is evacuated of air and put under a nitrogen charge. The temperature is increased to 38° C. and ethylene charged (45.8% of total). The reaction is initiated by adding 7.5% sodium formaldehyde sulfoxylate and dilute hydrogen peroxide. At initiation the temperature is increased gradually to 65° C. over 30 minutes. When the temperature reaches 65° C., addition of both the remaining vinyl acetate and ethylene is commenced The addition takes about 1½ hours. During this time activator and catalyst are added until the residual vinyl acetate concentration is below about 4% at which time the initiator is switched to concentrated hydrogen peroxide. The reactor charge is given in Table 1. The final dispersion solids are 65.3% and viscosity is 2900 cps. Th e overall polyurethane content based on total polymer solids is 4.0%.

TABLE 1

| Material | Parts by weight |
| --- | --- |
| Polyurethane (40% solids) | 7.00 |
| D.I. Water | 13.70 |
| Vinyl acetate | 55.54 |
| Ethylene | 11.78 |
| 1% ferrous sulfate | 0.09 |
| 7.5% Sodium formaldehyde sulfoxylate | 3.84 |
| 0.7% Hydrogen peroxide | 7.10 |
| 6.0% Hydrogen peroxide | 0.93 |
| Total | 99.98 |

EXAMPLE 2

Vinyl Acetate-Ethylene Copolymers Costabilized In The Presence of Nonionic Polyurethane And Polyvinyl Alcohol General Procedure Into a dry vessel equipped with agitator, nitrogen inlet, jacket equipped with heating and cooling, delay feed lines and capable of pressurization to 1000 psi is charged D.I. water, the Airvol polyvinyl alcohol solution, and the aqueous nonionic urethane dispersion of Comparative Example 1. The pH is adjusted to 3.6 with phosphoric acid. A 1% iron solution is added and, with agitation on, the charge of vinyl acetate is added. The reactor is evacuated of air and put under a nitrogen charge. The temperature is increased to 38° C. and ethylene charged. The reaction is initiated by adding 7.5% sodium formaldehyde sulfoxylate and dilute hydrogen peroxide. At initiation, the temperature is increased gradually to 65° C. over 30 minutes. At temperature, activator and catalyst are continued to be added until the residual vinyl acetate concentration is below about 4% by weight at which time the initiator is switched to concentrated hydrogen peroxide. The final dispersion solids are 54.2% and viscosity is 650 cps. The overall polyurethane content based on total polymer solids is 3.0% and the polyvinyl alcohol content is 2.0%. The reactor charge is given in Table 2.

TABLE 2

| Material | Parts by Weight |
| --- | --- |
| Polyurethane (40% solids) | 4.37 |
| Airvol 325 PVOH(10% solution) | 11.04 |
| D.I. Water | 20.47 |
| Vinyl acetate | 44.88 |
| Ethylene | 10.32 |
| 1% ferrous sulfate | 0.09 |
| 7.5% Sodium formaldehyde sulfoxylate | 3.77 |
| 0.7% Hydrogen peroxide | 3.08 |
| 6.0% Hydrogen peroxide | 1.97 |
| Total | 99.99 |

EXAMPLE 3

Adhesive Testing Of VAE Emulsions Prepared In The Presence of Nonionic Polyurethane and Polyvinyl Alcohol Stabilizers A series of vinyl acetate/ethylene emulsions were prepared in accordance with the general procedures of Examples 1 and 2, the percent ethylene incorporation being varied and calculated to be about 18.7% and 23.8% in the resulting copolymer. The stabilizer was varied from one using the nonionic polyurethane stabilizers alone, to polyvinyl alcohol alone and to the combination of nonionic polyurethane with various polyvinyl alcohols. The level was 5% based upon the weight of the vinyl acetate. The polyurethane stabilizers had the Henkel designations PC-14 and PC-17. Tests were conducted on various emulsions which included various conventional adhesion tests, to speed of set and creep resistance. The properties of the emulsions and the results are set forth in Table 3.

TABLE 3

| | Preferred Compositions | | | Comparison | | | | |
| --- | --- | --- | --- | --- | --- | --- | --- | --- |
| Run | 1 | 2 | 3 | 4 | 5 | 6 | 7 | 8 |
| Type Urethane (%0) Level | PC 14 (2.5) | PC 17 (2.5) | PC 17 (2.5) | PC 14 (5.0) | PC 17 (5.0) | PC 17 (2.5) | | PC 15 (3.0) |
| Type Polyvinyl alcohol (%) Level | A 203 (2.5) | A 107 (2.5) | A 203 (2.5) | | | A 523 (2.5) | A 205 (3.0) A 523 (1.0) | CO 887 (2.0) |
| Cloth to cloth dry adhesion (pli) | 11.6 | 10.2 | 9.9 | 6.8 | 8.4 | 14.4 | 14.8 | 10.1 |
| Cloth to cloth wet adhesion (pli) | 3.0 | 2.9 | 2.9 | 3.3 | 4.5 | 1.8 | 1.4 | 4.11 |
| Dry/wet ratio (strength retention) | 26.1 | 28.3 | 29 | 47.8 | 53.9 | 12.5 | 9.3 | 40.6 |
| Cloth to PET adhesion (pli) | 0.35 | 0.52 | 0.41 | 0.33 | 0.32 | 0.36 | 0.17 | 0.67 |

TABLE 3-continued

| | Preferred Compositions | | | Comparison | | | | |
|---|---|---|---|---|---|---|---|---|
| Run | 1 | 2 | 3 | 4 | 5 | 6 | 7 | 8 |
| Cloth to PVC adhesion (pli) | 3.2 | 2.8 | 3.2 | 0.9 | 2.8 | 2.4 | 2.8 | 2.7 |
| Creep resistance (mm/min) | 0.07 | 0.08 | 0.07 | 0.46 | 0.6 | 0.05 | 0.018 | 0.93 |
| Speed of set (sec) | 12–15 | 12–15 | 6–9 | >15 | >15 | 12–15 | >15 | >15 |

PC-14 refers to a nonionic polyurethane of tetramethylxylylene diisocyanate and a polyethyleneglycol having an Mn ranging from 20,000–40,000.
PC-17 refers to a nonionic polyurethane of tetramethylxylylene diisocyanate, a polyethyleneglycol having an Mn ranging from 20,000–40,000 and a small amount of trimethylolpropane.
A-203 refers to Airvol 203 polyvinyl alcohol having a degree of hydrolysis of 87–89% and a 4% aqueous solution viscosity of 3.5–4.5 centipoises.
A-523 refers to Airvol 523 polyvinyl alcohol having a degree of hydrolysis of 87–89% and a 4% aqueous solution viscosity of 23–27 centipoises.
A-107 refers to Airvol 107 polyvinyl alcohol having a degree of hydrolysis of 98.0–98.8% and a 4% aqueous solution viscosity of 5.5–6.5 centipoises.

Discussion

The results show that the vinyl acetate/ethylene adhesives stabilized with the combination of nonionic polyurethane and polyvinyl alcohol gave superior wet adhesion to cloth and significantly reduced creep at elevated temperature while exhibiting excellent speed of set as compared to vinyl acetate emulsions stabilized with nonionic polyurethanes alone or costabilized with the nonionic polyurethane and surfactant. This was unexpected.

Vinyl acetate/ethylene emulsions when stabilized with the nonionic polyurethanes did not show outstanding creep qualities. For example, runs 4 and 5 show that when the vinyl acetate/ethylene emulsions were stabilized with the polyurethane stabilizer alone, creep was a minimum of 46 mm/min. Runs 1–3 show that creep was less than 0.10.

Dry adhesion of the costabilized vinyl acetate/ethylene adhesives was superior to the systems in which the nonionic polyurethane was used as the sole stabilizer. Compare runs 1–3 vs. runs 4 and 5. More importantly, cloth to cloth wet strength was superior for the systems which incorporated both nonionic polyurethane polyvinyl alcohol relative to those containing polyvinyl alcohol alone.

Speed of set is an indication of the time required to adhere to the substrate; a lower value being preferred. The results show that all of the costabilized emulsions had lower speed of set values than did the adhesives stabilized with the polyurethane stabilizer alone.

We claim:

1. In an aqueous based vinyl acetate/ethylene copolymer adhesive composition formed by the emulsion polymerization of vinyl acetate and ethylene in the presence of a nonionic polyurethane stabilizer comprised of the reaction product of a polyisocyanate and a hydrophilic component, the improvement which resides in utilizing a stabilizing system for the emulsion polymerization comprising a blend of said nonionic polyurethane stabilizer and polyvinyl alcohol wherein the weight percentage of said nonionic polyurethane stabilizer and said polyvinyl alcohol in said stabilizing system is from 15 to 75% polyurethane and 85 to 25% polyvinyl alcohol, said polyisocyanate component of said nonionic polyurethane stabilizer being an aliphatic, aromatic or cycloaliphatic diisocyanate, said polyvinyl alcohol having a degree of hydrolysis from 87 to 98.8 mole % and said ethylene concentration in said vinyl acetate/ethylene copolymer is from 5 to 40 percent by weight of said copolymer adhesive.

2. The aqueous based vinyl acetate/ethylene copolymer adhesive composition of claim 1 wherein the polyisocyanate in said nonionic polyurethane stabilizer is an aliphatic diisocyanate selected from the group consisting of tetramethylxylylene diisocyanate, isophorone diisocyanate, cyclohexane-1,4-diisocyanate, 4,4'-dicyclohexylmethane diisocyanate, 3,3-dimethyl-4,4-di(aminocyclohexyl)methane, hexamethylene diisocyanate and dodecamethylene diisocyanate.

3. The aqueous based vinyl acetate/ethylene copolymer adhesive composition of claim 2 wherein the hydrophilic component in said nonionic polyurethane stabilizer is a polyethylene ether of a divalent alkanol having from 2–6 carbon atoms.

4. The aqueous based vinyl acetate/ethylene copolymer adhesive composition of claim 3 wherein the number average molecular weight of the hydrophilic component is from 1000 to 20,000.

5. The aqueous based vinyl acetate/ethylene copolymer adhesive composition of claim 4 wherein the number average molecular weight of the vinyl acetate/ethylene copolymer adhesive composition is from 150,000 to 850,000.

6. The aqueous based vinyl acetate/ethylene copolymer adhesive composition of claim 3 wherein the stabilizing system is present in a proportion of from 3 to 10 percent by weight of the vinyl acetate in the vinyl acetate/ethylene copolymer adhesive composition.

7. The aqueous based vinyl acetate/ethylene copolymer adhesive composition of claim 6 wherein the hydrophilic component is polyethylene glycol.

8. The aqueous based vinyl acetate/ethylene copolymer adhesive composition of claim 7 wherein the number average molecular weight of the hydrophilic component is from 3000 to 12,000.

9. The aqueous based vinyl acetate/ethylene copolymer adhesive composition of claim 8 wherein the stabilizing system consists essentially of said polyurethane stabilizer and polyvinyl alcohol and said polyurethane is present in an amount of from 40 to 60 percent by weight and said polyvinyl alcohol is present in an amount from 40 to 60 percent by weight of said stabilizing system.

10. The aqueous based vinyl acetate/ethylene copolymer adhesive composition of claim 3 wherein the number average molecular weight of the polyvinyl alcohol component is from 100 to 100,000.

* * * * *